United States Patent [19]

Pastureau

[11] Patent Number: 5,047,449

[45] Date of Patent: Sep. 10, 1991

[54] FIRE PROTECTION MATERIAL

[75] Inventor: Nicole Pastureau, Eysines, France

[73] Assignee: Aerospatiale Society National Industrielle, Paris, France

[21] Appl. No.: 366,388

[22] Filed: Jun. 15, 1989

[30] Foreign Application Priority Data

Jun. 16, 1988 [FR] France .................. 88 08085

[51] Int. Cl.$^5$ .................................................. C08K 3/38
[52] U.S. Cl. ........................... 523/179; 523/138; 523/212; 524/405; 524/701; 521/907; 428/447
[58] Field of Search .............. 523/138, 179, 212; 524/405, 701; 521/907; 428/447

[56] References Cited

U.S. PATENT DOCUMENTS

| | | | |
|---|---|---|---|
| 3,868,346 | 2/1975 | Merrill | 524/701 |
| 3,897,387 | 7/1975 | O'Shaughnessy | 524/405 |
| 4,052,526 | 10/1977 | Pratt | 428/477 |
| 4,216,136 | 8/1980 | Stayner | 524/405 |
| 4,277,456 | 7/1981 | Dabrowski | 423/428 |
| 4,299,872 | 11/1091 | Miguel et al. | 428/117 |
| 4,686,244 | 8/1987 | Dietlein et al. | 523/179 |
| 4,694,030 | 9/1987 | von Bonin et al. | 523/179 |
| 4,719,251 | 1/1988 | Dietlein et al. | 523/218 |
| 4,863,985 | 9/1989 | Pouchol | 524/183 |

FOREIGN PATENT DOCUMENTS 1320362 11/1962 France .
2614033 10/1988 France .
7903967 11/1980 Netherlands .

Primary Examiner—Melvyn I. Marquis
Assistant Examiner—R. Dean, Jr.
Attorney, Agent, or Firm—Browdy and Neimark

[57] ABSTRACT

This material, essentially characterized in that it is flexible, employs simultaneously the two phenomena of intumescence and endothermicity to obtain optimal protection characteristics maintaining the element to be protected at a temperature below or in the order of 150° C. when it is subjected to thermal attack corresponding to a flame temperature of 700° to 1000° for a duration of at least one hour for a thickness of the material between 10 and 20 mm, comprises a binder (silicone elastomer) in a proportion of 30 to 35% by weight; a reinforcing charge (a metal oxide compatible with said silicone elastomer) in a proportion of 17 to 23% by weight; an active charge (an intumescent agent) in a production of 38 to 45% by weight; and an insulative charge in a proportion of 5 to 10% by weight, these proportions being relative to the total weight of said material.

5 Claims, No Drawings

FIRE PROTECTION MATERIAL

The present invention concerns a fire protection material designed to keep at the lowest temperature technically possible an element subjected to thermal attack, for example to a fire where the flame temperature is situated between 700° and 1,000° C.

It is also directed to a material of this kind which is flexible, of low cost, easy to use, requiring no work to be conducted in a specialist workshop but on the contrary enabling direct and convenient application in the field or on site, using simple techniques such as application by spraying or production by extrusion or moulding.

There are currently known a large number of fire protection materials. Their design, development, manufacture and use are based on one or the other of two phenomena, namely that of intumescence or that which is directed to slowing down as much as possible the propagation of the flame, or tends to do so.

Intumescence is a well know phenomenon which is defined as exploiting in the fight against fire the property that some bodies or substances have of swelling or expanding due to the action of heat or to a rise in temperature, so forming a barrier against thermal attack. This type of substance entails the conjugate action of pore forming agents and is widely used in the composition of paints which comprise a binder enabling a film to form, a substance rich in carbon and an intumescentor pore forming agent. The more commonly used foaming agents include ammonium phosphate and sulphate, urea, cyandiamide, sulphamic acid, boric acid, sodium borate and borax.

The phenomenon of intumescence is also exploited in various other materials. Illustrative examples of such materials are provided by U.S. Pat. Nos. 4,299,872, 4,160,073, 2,452,054 and 2,912,392.

The efficacy of these materials is related to the formation, due to the action of the heat, of a thick and porous carbon-containing layer which operates as a conventional insulator. This efficacy is then limited in duration and in performance, however, since it is well known that conventional insulators can only limit the increase in temperature of an element exposed to a fire for a short time.

Also, under some conditions, materials of this kind can function in an hazardous way. The insulative porous layer has no great structural strength and can therefore, as the result of abrasion, for example, be partially or totally destroyed, so enabling the fire to penetrate to the element to be protected.

To maximise the effectiveness of this type of material it is necessary to provide a location of sufficient size for the material to expand completely, some materials requiring for such expansion up to ten or even twenty times their initial volume. It will be understood that this dimensional condition cannot always be achieved in practice.

Another disadvantage resides in the fact that large quantities of gas and smoke are released and are sometimes toxic, which limits the application areas for these materials.

Flame retardant insulative materials usually use an epoxy or phenolic binder containing so-called "flame retardant" agents. These limit the temperature of the fire protection material to a value less than that at which it ignites. The flame retardant agents most often cited include borates, phosphates and some oxides such as antimony oxide.

These materials often include a charge which decomposes in an endothermic process. They also give rise to a succession of endothermic reactions which occur at increasingly higher temperatures.

In this field mention may be made of U.S. Pat. Nos. 4,521,543, 4,438,028, 4,001,126 and 3,114,840 and French patents Nos. 81,16303, 83,10560 and 85,19145.

These materials are primarily intended to protect elements subjected to high thermal fluxes. They are most widely used in the aerospace field and are offered in the form of finished materials intended to be applied subsequently to the structures to be protected.

Because of the phenomenon employed, which relies on a succession of endothermic reactions, the temperature of the protected elements increases gradually during the thermal attack or during the action of the thermal flux.

The present invention is directed to a fire protection material employing simultaneously the two phenomena of intumescence and endothermicity to obtain optimal protection characteristics maintaining the element to be protected at a temperature below or in the order of 150° C. when it is subjected to thermal attack corresponding to a flame temperature of 700° to 1,000° for a duration of at least one hour for a thickness of the material between 10 and 20 mm.

The material in accordance with the invention having these particular properties is therefore essentially characterised in that it is a flexible material comprising:
- a binder which is a silicone elastomer in a proportion of 30 to 35% by weight;
- a reinforcing charge which is a metal oxide compatible with said silicone elastomer in a proportion of 17 to 23% by weight;
- an active charge which is an intumescent agent also giving rise to an endothermic reaction in a proportion of 38 to 45% by weight; and
- an insulative charge in a proportion of 5 to 10% by weight, these proportions being relative to the total weight of said material.

By virtue of other characteristics:
- the silicone elastomer binder is selected from the silicone elastomers which polymerise by polycondensation and the silicone elastomers which polymerise by polyaddition;
- the reinforcing charge is preferably selected from rutile type titanium oxides, advantageously a variety of titanium oxides containing at least 90% of $TiO_2$ (by weight) and having been subject to surface treatment (silanes) rendering it compatible with the silicone elastomers;
- the active charge is preferably borax $Na_2B_4O_7$, 10 $H_2O$
- the insulative charge is preferably of the mica or vermiculite type.

With a material of this kind it is seen that due to the action of heat (in fact as soon as the temperature reaches 100° C.; the active charge (the borax) decomposes, producing water which is vapourised and which behaves in relation to the fire protection as an intumescent agent. The vapourisation of the water is an endothermic reaction, which contributes to reducing the surface temperature of the protection material.

As previously mentioned, the efficacy of this material is therefore based on the simultaneous employment of the two phenomena of intumescence and endothermicity of the reaction whereby the water contained in the active charge is vapourised. This can only be achieved by careful choice of the constituents of the material and their proportions. In particular, the amplitude of the intumescence must be controlled and limited. It must result in a progressive but sufficient release in relation to the thermal aggression of the activity of the endothormic charge without impeding the free progress or the free manifestation of the phenomenon of intumescence. The optimal intumescence ratio must therefore be situated with advantage between 3/1 and 5/1 (by volume).

Also, it will be noted that the choice of the nature and the proportions of the materials is dictated by the fact that too little or too much intumescence reduces the time for which the temperature of the element to be protected is stabilised: in the case of too little intumescence this is because of excessive limitation of the degradation of the active charge and an increase in the overall thermal conductivity of the material, whereas in the case of too much intumescence it is because of excessively fast degradation of the active charge and because of the risk of partial degradation of the intumescent layer when it has become fragile.

The optimal degradation speed and intumescence associated with a satisfactory overall thermal conductivity of the material are achieved in accordance with the invention with a silicone elastomer binder and an active charge, both correctly chosen and utilised in well defined proportions, and there is also included in the formulation, in strictly defined proportions, on the one hand a reinforcing charge (titanium oxide) which improves the structural strength of the intumescent layer and also acts as a flame retardant and, on the other hand, an insulative charge (mica, vermiculite) which provides a material whose performance is greatly improved by virtue of the reduced thermal conductivity of the sound material.

In application of the invention, the thickness providing good protection against fire is between 10 and 20 mm, depending on the time for which the temperature is to be stabilised and the temperature that the element to be protected can withstand (<150° C). A thickness of 14 mm represents an ideal compromise: intumescence—speed of degradation of the active charge—mechanical strength of the surface layer following thermal attack.

With the principal aim of constituting a thermal shield for an element to be protected from fire, the material of the invention lends itself to various techniques for forming said shield and for applying it. The techniques which may be used include application with a spatula, extrusion, moulding and other well-known techniques.

Generally speaking, the method of obtaining this material will comprise the operational steps of mixing the constituents carried out in the following order:

There is incorporated into the necessary quantity of silicone elastomer binder firstly the necessary quantity of the reinforcing charge and then the necessary quantity of the active charge and finally the necessary quantity of the insulative charge.

Generally speaking, the charges are advantageously incorporated into the basic silicone elastomer by means of a planetary type mixer. The rotation speed of the mixer should not be too high, to avoid significant temperature rise in the mixture which would lead to premature reduction in the efficacy of the charge giving rise to the required endothermic reaction.

According to how the material is to be used, either a silicone elastomer which polymerises by polycondensation or a silicone elastomer which polymerises by polyaddition is chosen.

If the material is prepared for immediate application to the element to be protected an elastomer which polymerises by polycondensation is preferably used, with the addition of a catalyst which is usually a tin salt such as, for example, dibutyl tin dilaurate or tin octoate, the latter advantageously procuring faster polymerisation at ambient temperature.

On the other hand, where the material is manufactured in a workshop by means of injection moulding presses, for example, for subsequent application of a preshaped part to an element to be protected, an elastomer which polymerises by polyaddition is preferably used.

Similarly, a silicone elastomer whose viscosity is less than 1,500 mPa.s at 25° C. is preferably used. However, silicone bases with a slightly higher viscosity can be used provided that low-viscosity (50, 100, 300 mPa.s) polysiloxane oil is added to enable the incorporation of the active, insulative and reinforcing charges. The quantity of oil used shall not then exceed 5% by weight of the total composition.

Whatever the protective material is prepared it must be made to adhere to the element to be protected, whether the latter is made of metal or a composite material, etc. This adhesion can be achieved:

either by application of a primer, generally silicone-based, especially where the protective material is applied by spraying in a well-known method, and naturally after the surface to be protected has been appropriately treated, for example degreased, sandblasted, polished, etc;

or by adhesive bonding using appropriate well-known adhesives.

Use may also be made of certain binders for these silicone elastomers which are in themselves self-adhesive and therefore require no specific surface treatment beforehand. It is important that the adhesion means adopted satisfy the condition of not becoming detached from the element to be protected during thermal attack.

The following examples are given purely by way of non-limiting illustrations of the invention.

EXAMPLE 1

The following composition was prepared and used to make a protective panel in order to evaluate its efficacy in a fire:

| | |
|---|---|
| RTV-121* silicone elastomer | 33% by weight. |
| $TiO_2$ $C_1$ 220+ | 19% by weight. |
| borax° | 38% by weight. |
| vermiculite | 10% by weight. |

*product marketed by the company Rhone-Poulenc, containing a tin catalyst silicone elastomer;
+variety of titanium oxide marketed by the company Société Industrielle du Titane A;
°$Na_2B_4O_7$, 10 $H_2O$ Fire test:
flame temperature: 800° C;
distance between material to be protected and flame: 200 mm.

The results of this test are shown in Table 1 below.

TABLE 1

| Thickness of material | Maximum temperature of element protected | Duration of protection |
| --- | --- | --- |
| 10.6 mm | 100° C. | At least one hour |
| 14.8 mm | 78° C. | At least one hour |

Example 2

A mixture of the same constituents in the following proportions was prepared:

| | |
| --- | --- |
| RTV-12* silicone elastomer | 30.2% by weight, |
| $TiO_2$ $C_1$ 220 | 18.7% by weight, |
| borax | 44.4% by weight, |
| vermiculite | 6.7% by weight. |

*marketed by the company General Electric, containing a tin catalyst silicone elastomer.

Fire test:

As in example 1, fire tests were conducted using a shield made from this composition:
flame temperature: 800° C.;
distance between protected element and flame: 200 mm.

The results of this test are shown in Table 2 below:

TABLE 2

| Thickness of material | Maximum temperature of element protected | Duration of protection |
| --- | --- | --- |
| 10.2 mm | 140° C. | At least one hour |
| 13.4 mm | 140° C. | At least one hour |

Example 3

A composition was prepared with the same constituents as those listed for examples 1 and 2 above but containing no vermiculite and fire tests were carried out using a material obtained from this composition:

| | |
| --- | --- |
| RTV-141* silicone elastomer | 35% by weight, |
| $TiO_2$ $C_1$ 220 | 23% by weight, |
| borax | 42% by weight. |

*product marketed by the company Rhone-Poulenc containing a tin catalyst silicone elastomer.

Fire test:
flame temperature: 800° C.;
distance between protected element and flame: 200 mm.

The results obtained show that if the protective material was allowed to expand from an initial thickness of 8 mm the maximum temperature reached in a period of 65 minutes was 120° C.

On the other hand, if the protective material was not allowed to expand, by applying over it a fine-mesh metal grid, the maximum temperature reached by the protected element with an initial thickness of the material of 10 mm was 200° C. Protection at this temperature could be provided for 31 minutes.

Example 4

The same method was used as in the previous examples and with the following composition containing no $TiO_2$:

| | |
| --- | --- |
| RTV-141 | 44% by weight, |
| borax | 48% by weight, |
| vermiculite | 8% by weight. |

The fire test conducted under the same conditions as previously with a flame temperature of 800° C. and a distance of 200 mm between the material to be protected and the flame gave the following results:
maximum temperature reached: 500° C.;
thickness of protective material: 12 mm;
duration of fire: one hour.

Example 5

This example gives the results obtained with a composition of the protective material in which the vermiculite was replaced with microspheres of silica:

| | |
| --- | --- |
| RTV-121 | 33% by weight, |
| borax | 38% by weight, |
| $TiO_2$ | 19% by weight, |
| silica microspheres | 10% by weight. |

On conducting the fire test under the same conditions as previously with a protective material thickness of 10 mm the maximum temperature of the element protected was 270° C. after 26 minutes.

Example 6

The method was the same as previously using the following composition in which the $TiO_2$ was replaced with ground silica:

| | |
| --- | --- |
| RTV-121 | 33% by weight, |
| borax | 38% by weight, |
| ground silica | 19% by weight, |
| vermiculite | 10% by weight. |

The results for a 10 mm thickness of the material in a fire test conducted under the same conditions as those indicated hereinabove show a maximum temperature at the element to be protected of 320° C. after 16 minutes.

These examples show the unique benefit and the specific efficacy of the material in accordance with the invention providing protection to a maximum temperature below or in the order of 150° C. with a thickness between 10 and 20 mm. Note that a modification to the nature of the constituents or their proportions makes it impossible to achieve these objectives.

It goes without saying that the present invention has been described by way of non-limiting illustrative example only and that any modifications may be made thereto, in particular with regard to technically equivalent means, without departing from the scope of the invention.

I claim:

1. Fire protection material employing simultaneously the two phenomena of intumescence and endothermicity to obtain optimal protection characteristics maintaining the element to be protected at a temperature below or about 150° C. when it is subjected to thermal attack corresponding to a flame temperature of 700° to 1,000° C. for a duration of at least one hour for a thickness of the material between 10 and 20 mm, essentially characterized in that it is a flexible material comprising:

a binder which is a silicone elastomer in a proportion of 30 to 35 % by weight;

a reinforcing charge which is a metal oxide compatible with said silicone elastomer in a proportion of 17 to 23% by weight;

an active charge of borax ($Na_2B_4O_7, 10H_2O$) in a proportion of 38 to 45% by weight; and an insulative charge of mica or vermiculite in a proportion of 5 to 10% by weight, these proportions being relative to the total weight of said material.

2. Material according to claim 1 wherein the silicone elastomer binder is selected from the group consisting of silicone elastomers polymerized by polycondensation and silicone elastomers polymerized by polyaddition.

3. Material according to claim 1 wherein the metal oxide reinforcing charge is a rutile type titanium oxide consisting essentially of titanium oxides containing at least 90% of $TiO_2$ (by weight) and having been subject to surface treatment rendering said oxides compatible with the silicone elastomers.

4. Method of obtaining the material according to claim 1 comprising the operational steps of mixing the constituents carried out in the following order: there is incorporated into the necessary quantity of silicone elastomer binder firstly the necessary quantity of the reinforcing charge and then the necessary quantity of the active charge and finally the necessary quantity of the insulative charge.

5. A material according to claim 1 in the form of a layer of thickness in the range of 10–20 mm.

* * * * *

UNITED STATES PATENT AND TRADEMARK OFFICE
CERTIFICATE OF CORRECTION

PATENT NO. : 5,047,449
DATED      : September 10, 1991
INVENTOR(S) : Nicole PASTUREAU It is certified that error appears in the above-identified patent and that said Letters Patent is hereby corrected as shown below:

Title page, item

[73] Assignee:   Delete "Aerospatiale Society National Industrielle", insert therefor
-- Aerospatiale Societe Nationale Industrielle --

Signed and Sealed this

Twentieth Day of April, 1993

Attest:

MICHAEL K. KIRK

*Attesting Officer*    Acting Commissioner of Patents and Trademarks